(12) United States Patent
Anno et al.

(10) Patent No.: US 6,535,261 B1
(45) Date of Patent: Mar. 18, 2003

(54) LIQUID CRYSTAL DISPLAY DEVICE

(75) Inventors: Kouichi Anno, Mobara (JP); Hiroshi Okawara, Mobara (JP); Masaaki Matsuda, Mobara (JP); Tetsuya Kawamura, Mobara (JP); Takeshi Tanaka, Chiba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/443,108

(22) Filed: Nov. 18, 1999

(30) Foreign Application Priority Data

Nov. 19, 1998 (JP) .............................. 10-329669

(51) Int. Cl.⁷ ............................................ G02F 1/1345
(52) U.S. Cl. ......................................... 349/147; 349/40
(58) Field of Search .................................. 349/147, 148, 349/149, 151, 192, 40

(56) References Cited

U.S. PATENT DOCUMENTS

| | | | | |
|---|---|---|---|---|
| 5,614,727 A | * | 3/1997 | Mauri et al. ................... 257/43 |
| 5,748,170 A | * | 5/1998 | Ito et al. ....................... 349/152 |
| 5,930,607 A | * | 7/1999 | Satou .......................... 438/158 |
| 5,949,502 A | * | 9/1999 | Matsunaga et al. ........... 349/40 |
| 6,111,625 A | * | 8/2000 | Ohta et al. ................... 349/141 |

* cited by examiner

Primary Examiner—Kenneth Parker
(74) Attorney, Agent, or Firm—Antonelli, Terry, Stout & Kraus, LLP (57) ABSTRACT

A technique is provided for eliminating on-screen display irregularities or defects otherwise occurring due to re-attachment of flying fragments or the presence of residual cutaway portions during electrode cutting processes using laser light. During manufacture of an active-matrix substrate, a separator section is used to connect image signal electrode lead terminals in common together to an electrostatic protective lead to perform electrostatic protection of thin-film transistors, and the separator section is comprised of a laminated structure of a low-resistivity metal layer and high-melting-point metal layer.

4 Claims, 8 Drawing Sheets

LIQUID CRYSTAL DISPLAY DEVICE

BACKGROUND OF THE INVENTION

1. Field of the Invention

The present invention relates generally to liquid crystal display devices of the active matrix type and, more particularly, to a liquid crystal display device with avoidability of on-screen image display irregularities such as line defects occurring due to cutting failure and/or re-attachment of melt components during cut-away processes of electrode leads for use in driving picture elements or "pixels".

2. Description of the Related Art

In recent years, active-matrix liquid crystal display devices with thin-film transistors used as its switching elements are widely employed as those liquid crystal display devices adaptable for use as monitor units of various types in image visualization equipment and/or information processing apparatus.

A typical liquid crystal display device of this type is arranged to include an active matrix substrate with a plurality of (multiple) thin-film transistors for pixel selection formed on an electrically insulating or dielectric substrate and a color filter substrate having thereon a common electrode and color filter, which substrates are bonded together to define therebetween a thin gap space in which a layer of liquid crystals is sealed to thereby provide a liquid crystal panel with requisite driver circuitry assembled together.

While the liquid crystal display device of this type has traditionally been designed to employ so-called "tape automated bonding (TAB)" techniques for using a flexible printed circuit board tape carrier package (TCP) with built-in driver circuits mounted thereon to electrically connect between on-board electrical leads, such as image signal electrode leads and scanning electrode leads, and the driver circuits operatively associated therewith, the trend of modern LCD industry is to employ chip-on-glass (COG) architectures for directly mounting the driver circuits of a liquid crystal panel on one of the substrates thereof as the requirements are becoming more strict to further increase the effective display screen area while reducing the panel thickness when assembling into portable personal computers and the like.

These conventional liquid crystal display devices are designed to be equipped with an electrostatic protective lead (anti-static lead) for protecting the thin-film transistors or the like thereof from static damages during manufacturing processes of an active matrix substrate thereof. The electrostatic protective lead is electrically connected to an image signal electrode lead as provided inside of the liquid crystal panel at an extra portion of a mother board which will be removed from the liquid crystal panel during a cut-out process thereof from the mother board. The image signal electrode lead and electrostatic protective lead are formed of a thin film made typically of indium-tin-oxide (ITO), respectively.

Figure 8A:
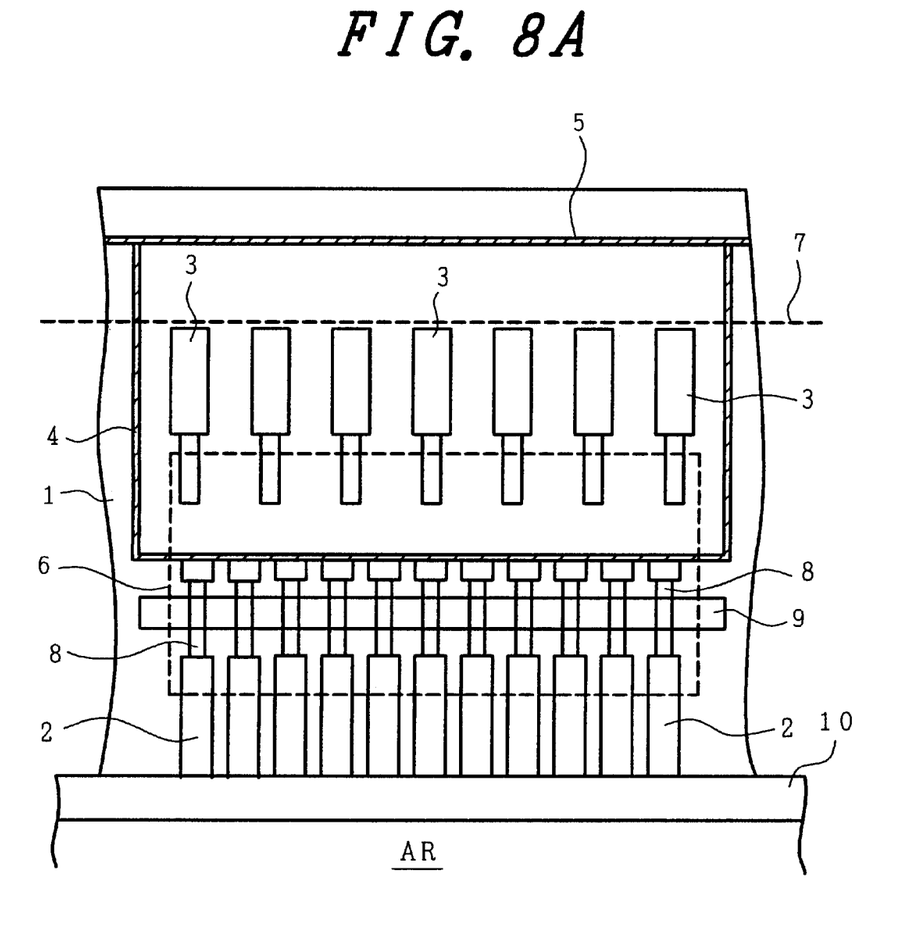
FIG. 8A is a plan view of an image signal electrode lead extension section of a liquid crystal panel constituting one prior known liquid crystal display device.
Figure 8B:
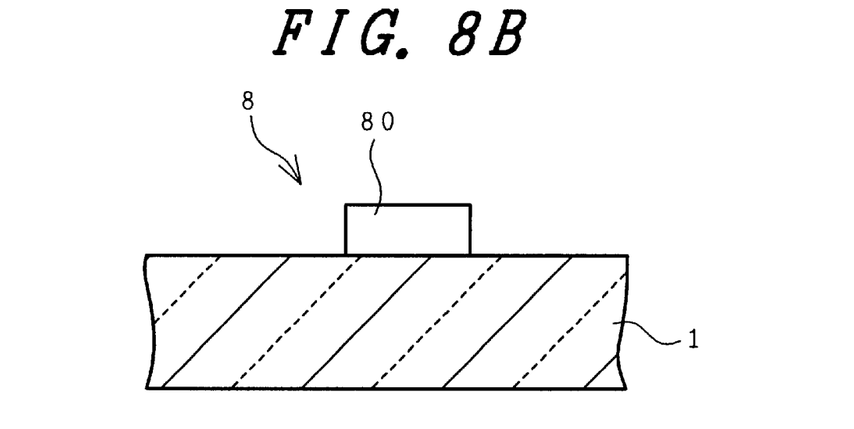
FIG. 8B depicts in cross-section a separator section of FIG. 8A taken along the scan direction of laser irradiation.

FIGS. 8A and 8B are diagrams for explanation of an image signal electrode lead extension portion of a liquid crystal panel constituting one of conventional liquid crystal display devices, wherein FIG. 8A illustrates a plan view of main part corresponding to a single image signal electrode driving circuit whereas FIG. 8B depicts in cross-section an image signal electrode lead thereof.

As shown in FIG. 8A, this liquid crystal panel is structured from an active matrix substrate 1 and a color filter substrate 10 as bonded together to define a gap space therebetween in which a layer of liquid crystals is sealed. At the periphery of the active matrix substrate 1, a common lead 5 for electrostatic protection is formed outside of a cut line 7 to be cut during manufacturing. This electrostatic protective common lead 5 is formed with an electrostatic protective lead 4 while a plurality of image signal electrode leads 2 that are extended from the side of an effective display area AR are connected to this electrostatic protective lead 4.

Reference numeral "3" designates external connection terminals each serving as an input terminal of an image signal electrode driver circuit (IC) 6, to which an output of external circuitry, not shown, is coupled. A separation section 8 is formed between a respective one of the image signal electrode leads 2 and its associated electrostatic protective lead 4, wherein irradiation of laser light on a laser scan region 9 of this separator section 8 may enable cut-away for separation between the image signal electrode lead 2 and electrostatic protective lead 4 from each other.

As better shown in FIG. 8B, the separator section 8, which couples the image signal electrode leads 2 and the electrostatic protective lead 4, is comprised of an ITO layer 80 in the form of a transparent conductive film. The ITO separator section 8 extending between the image signal electrode leads and the electrostatic protective lead is cut by a laser beam before or after the active matrix substrate is cut into a product size, while letting the driver circuit (IC) 6 be mounted at this cut portion.

SUMMARY OF THE INVENTION

Unfortunately, in view of the fact that the ITO material is inherently high in electrical resistivity and also has a wide lead width splashy fragments or particles can badly behave to again attach or re-adhere to those portions between neighboring ones of the image signal electrode leads 2 during the cutaway processes using laser light, resulting in creation of undesired electrical short-circuiting therebetween. In addition, while a YAG laser that is widely used today to effect such a cutaway process of this kind measures 1.065 micrometers ($\mu$m) in wavelength, ITO material exhibits a high transmissivity of those rays of light with wavelength values greater than or equal to that of visible light, so that the laser light cutting processes are less efficient. Due to this inefficiency, several ITO portions in the cutting area fail to be removed away and remain thereat, which sometimes results in a failure to adequately separate the image signal electrode leads 2 and electrostatic protective lead 4 from each other.

While swarf being blown up and reattached and/or remaining at cut portions causes electrical short circuits on the active matrix substrate, line defects take place on the display screen of the liquid crystal display panel, cause product defects thereof, and thus reduce the manufacturing yield and reliability thereof.

One of objects of the present invention is to avoid the aforementioned problems in the prior art and to provide a liquid crystal display device suitable for improving the manufacturing yield and product reliability thereof.

To attain the foregoing object, the present invention provides a specific device structure wherein a separator section for use in cutting away by laser light for separation of those electrode leads formed on an active matrix substrate—specially, image signal electrode leads and electrostatic protective lead—is arranged to have a laminated structure including a low-resistivity metal layer and a high-melting-point metal layer (e.g. a refractory metal layer). In addition, this laminated structure is coated with an insulating film.

(1) One of typical structures of the liquid crystal display devices in accordance with the invention is defined as follows.

The liquid crystal display device comprises:

a color filter substrate having a common electrode and color filters of multiple colors on an insulating substrate;

an active-matrix substrate having a plurality of scan electrode leads formed on an insulating substrate, a plurality of image signal electrode leads formed to cross over or intersect the scan electrode leads, a plurality of thin-film transistors as two-dimensionally laid out to connect to the scan electrode leads and the image signal electrode leads for forming an effective display area, picture element electrodes connected to the thin film transistors respectively, more than one additional capacitance element connected to the picture element electrodes, a common electrode lead terminal for connection to the common electrode as formed on the color filter substrate, scan electrode lead terminals railed to extend from the scan electrode leads and image signal electrode leads up to one outer side of the effective display area along with image signal electrode lead terminals extending to a remaining side neighboring to the one side, and a dielectric protective film coating at least the thin film transistors, said active-matrix substrate opposing said color filter substrate with a specified gap space defined therebetween for letting liquid crystals reside therein;

driver circuitry including a scan electrode driver circuit and an image signal electrode driver circuit for supplying the scan electrode lead terminals and the image signal electrode lead terminals with a signal voltage for use in visually displaying images;

a separator section connected in common to the image signal.electrode lead terminals during manufacture of the active-matrix substrate for separating between an electrostatic protective lead for use in protecting said thin film transistors against static electricity and the picture element signal electrode lead terminals, wherein at least one of separation sections for use in separating from the image signal electrode lead terminals the electrostatic protective lead for protecting from any possible static electricity the thin-film transistors connected in common to these image signal electrode lead terminals during manufacturing processes of the active matrix substrate has an arrangement including a multi-layer lamination structure of a low resistivity metal and a high-melting-point metal.

This separator section may be either part of the image (pixel) signal electrode lead terminal or part of the electrostatic protective lead. In either case, it will be desirable that the liquid crystal display device is manufactured in a way such that upon completion of a product those lead layers having the above-noted laminated (e.g. multi-layered) structure oppose each other between the image signal electrode lead terminals and electrostatic protective lead.

It should be noted that in the case of provision of an electrostatic protective lead on the side of the scan electrode leads also, letting a separator section of this scan electrode lead side and its associated electrostatic protective lead have a similar multi-layered structure makes it possible to obtain similar effects to those in separation of the image signal electrode leads.

(2) Said separator section in (1) is arranged so that it includes a layer made of chromium or an alloy containing therein chromium as its major component and a layer of aluminum or an alloy containing therein aluminum at an, amount of 50 percent or more plus a dielectric protective film, these layers being laminated over each other in this order of sequence as looking at from the side of said active matrix substrate (the principal surface side of this substrate).

With such an arrangement, in case the high-melting-point metal has a low-resistivity metal layer on the top surface thereof, when the high-melting-point metal is vaporized due to irradiation of laser light, the overlying metal layer will simultaneously be removed away—or alternatively, where it has a dielectric film, this film will be removed away—thereby absenting either electrical contact between neighboring electrode leads or contact with respect to the electrostatic protective lead, which results in improvements in production yield and product reliability.

Also note that the present invention should not be limited only to the above-noted arrangements and more than one embodiment as will be described later in the description and may be modified into a wide variety of forms for practical implementation of the inventive teachings as disclosed herein without departing from the spirit and scope of the invention.

These and other objects, features and advantages of the present invention will become more apparent from the following description when taken in conjunction with the accompanying drawings.

DETAILED DESCRIPTION

One preferred embodiment of the present invention will be described in detail below. Note here that although this embodiment is illustratively presented as a liquid crystal display device of what is called the "chip-on-glass (COG,)" type which has at a terminal section on an active-matrix substrate those semiconductor elements or components making up part of driver circuitry thereof, the instant invention may also be similarly applicable when the need arises to those liquid crystal display devices of the, TAB scheme with all of the driver circuits mounted on an outer-side substrate of a liquid crystal panel.

Figure 1A:
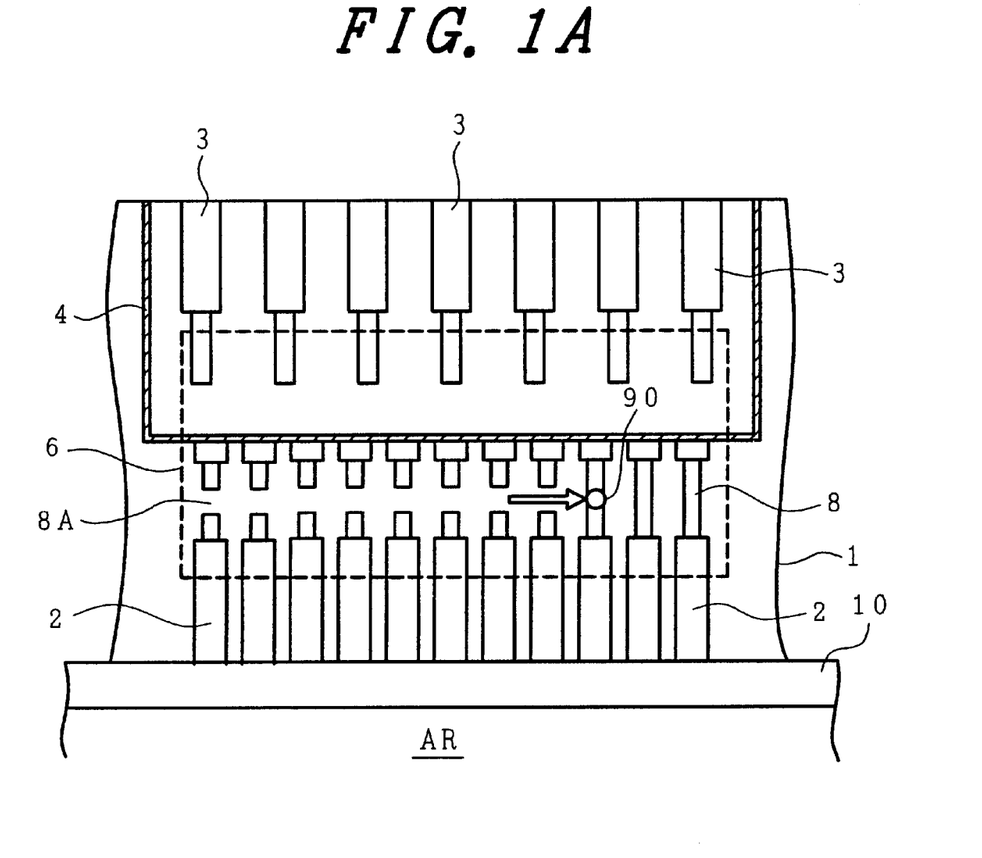
FIG. 1A is a diagram showing a plan view of an image signal electrode lead terminal section of a liquid crystal panel as will be explained in a first embodiment of the liquid crystal display device in accordance with the present invention, and FIG. 1B pictorially represents a cross-sectional structure of a separator section of FIG. 1A as taken along in a scanning direction of laser irradiation.
Figure 1B:
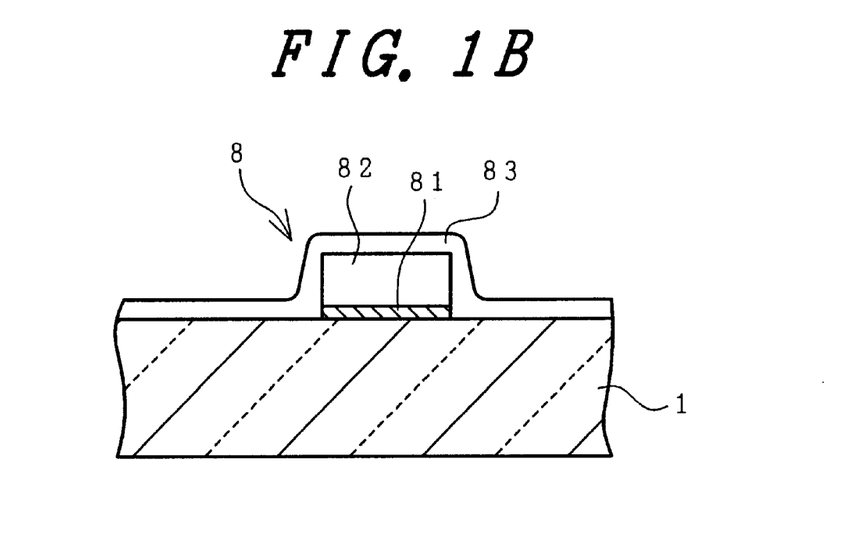

Referring now to FIG. 1A, there is illustrated a plan view of an image signal electrode lead-terminal section of a liquid crystal panel of a liquid crystal display device in accordance with one embodiment of the invention. FIG. 1A is an enlarged view of a certain portion (peripheral edge portion) of the liquid crystal panel obtained after completion of a cutaway process along the cut line 7 as has been explained in conjunction with FIG. 8A whereas FIG. 1B depicts a sectional view of a separator section. Note that the same parts or components are designated by the same reference characters as used in FIGS. 8A–8B.

As shown in FIG. 1A, a separator section 8 of each of image signal electrode leads 2 and an electrostatic protective lead 4 associated therewith is such that scanning an irradiated beam spot of laser light (laser spot) 90 along the above-noted laser scan region 9 shown in FIG. 8A results in obtainment of a cutaway portion 8A after having cut such separator section 8.

FIG. 1B shows a sectional view of one separator section 8 of FIG. 1A. This separator section 8 has a laminated structure which is obtainable by a method including the steps of fabricating a chromium thin-film layer 81 on an active-matrix substrate 1 that is preferably made of a glass plate and then forming thereon an aluminum thin-film 82 and further forming an electrically insulating or dielectric protective film 83 overlying the film. The dielectric protective film 83 may be a PAS film such as a SiN film or else by way of example.

In the laminated structure shown in FIG. 1B, chromium is such that its melting point is 1,860° C., boiling point is 2,670° C., and electrical resistivity is $12.9 \times 10^{-6}$ $\Omega \cdot cm$ whereas aluminum is such that its melting point is 660° C., boiling point is 2,470° C., and resistivity is $655 \times 10^{-6}$ $\Omega \cdot cm$. It is apparent that one of the layers (Cr-layer) in the laminated structure has a higher melting point than that of another (Al-layer) thereof, and the another has lower electrical resistance than that of the one.

In cases where the separator section 8 is made of such aluminum thin-film 82 alone, the aluminum thin-film 82 that is low in melting point will be vaporized after once melted. Due to this behavior, dissolved aluminum portions during such vaporization can be adhered to neighboring image signal electrode leads and/or to a mount section of a driver circuit 6. This would result in occurrence of unwanted electrical short-circuiting between image signal electrode leads or alternatively between those electrodes of the driver circuit 6, which in turn leads to creation of product defects.

By contrast, in case the laminated (multi-layered) structure of the embodiment shown in FIGS. 1A–1B is subjected to a cutting process using a YAG laser, the underlying chromium layer 81 less in difference between the melting point and boiling point thereof will exhibit sublimation due to heat application of laser light while at the same time permitting its overlying aluminum layer 82 to vaporize together, which may prevent creation of any possible product defects otherwise taking place due to reattachment of melted aluminum film fragments or "swarf"chips leading to occurrence of electrical short-circuit at unexpected portions when mounting of driver circuitry.

It should be noted that although in the illustrative embodiment the upper layer of the separator section 8 is made of a chosen low-resistivity material such as aluminum, the invention should not exclusively be limited thereto and the same results are obtainable by replacing it with certain alloys containing therein aluminum as the major component thereof. In addition, while chromium is considered most preferable for the material of the underlying high-melting-point layer, it will be permissible where necessary to replace it with other similar suitable materials including chromic alloys, or alternatively tungsten, molybdenum, or tantalum (so-called refractory metals), or any alloys thereof.

Figure 2:
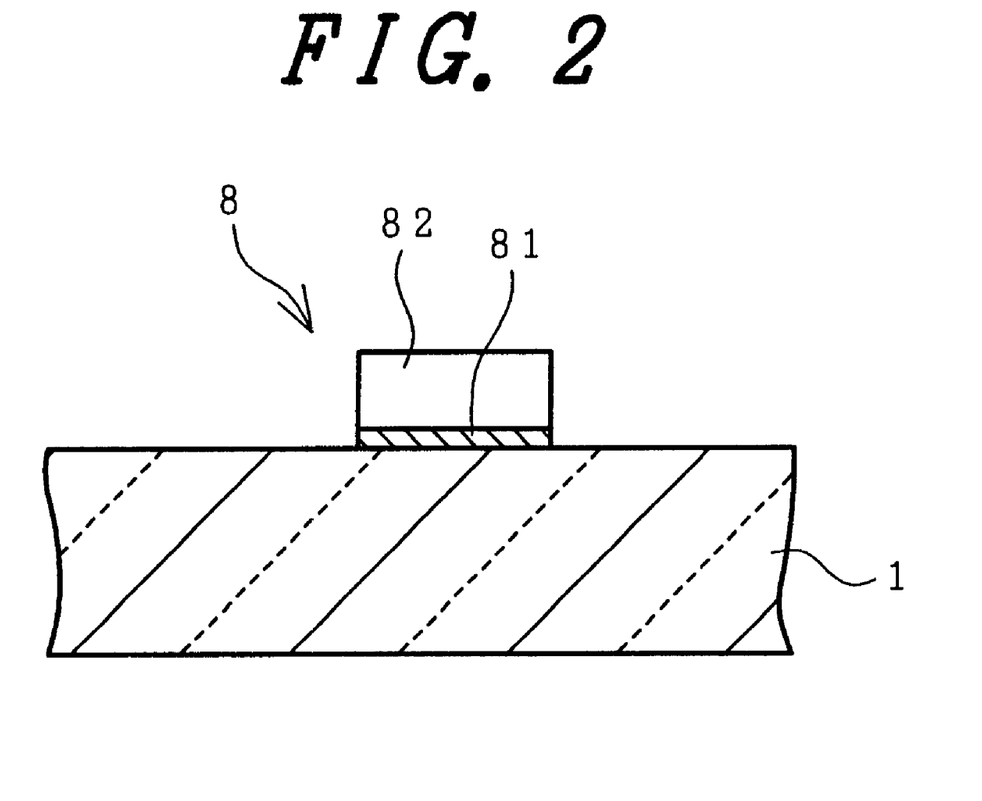
FIG. 2 illustrates, in cross-section, a separator section at an image signal electrode lead terminal section of a liquid crystal panel as will be explained in a second embodiment of the liquid crystal display device of this invention.

Turning now to FIG. 2, there is illustrated in cross-section a separator section at an image signal electrode lead terminal section of a liquid crystal panel for explanation of a second embodiment of the liquid crystal display device in accordance with the invention. Note that the same reference numerals are used to denote the same or corresponding components stated in conjunction with FIGS. 1A–1B.

The FIG. 2 embodiment is similar in structure to that shown in FIG. 1B with the exception that the dielectric protective film 83 has been eliminated. More specifically, a chromium thin-film layer 81 is fabricated on the active-matrix substrate 1, on which layer an aluminum thin-film layer 82 is formed.

With this embodiment also, a similar advantage to that of the first embodiment stated supra is achievable—that is, in case the laminated structure is cut by use of YAG laser, an underlying chromium layer 81 less in difference between the melting point and boiling point thereof will exhibits sublimation due to heat application of laser light while at the same time permitting its overlying aluminum layer 82 to vaporize together, which may eliminate creation of product defects otherwise taking place due to attachment of melted aluminum fragments leading to occurrence of electrical short-circuit at unexpected portions when mounting of driver circuitry. Additionally the materials usable herein are the same as those discussed previously with regard to the first embodiment.

It is noted that in the case of provision of an electrostatic protective lead on the scan electrode lead side also, a separator section associated with this scan electrode lead side and the electrostatic protective lead may be designed into a similar laminated or multi-layered structure.

Figure 3:
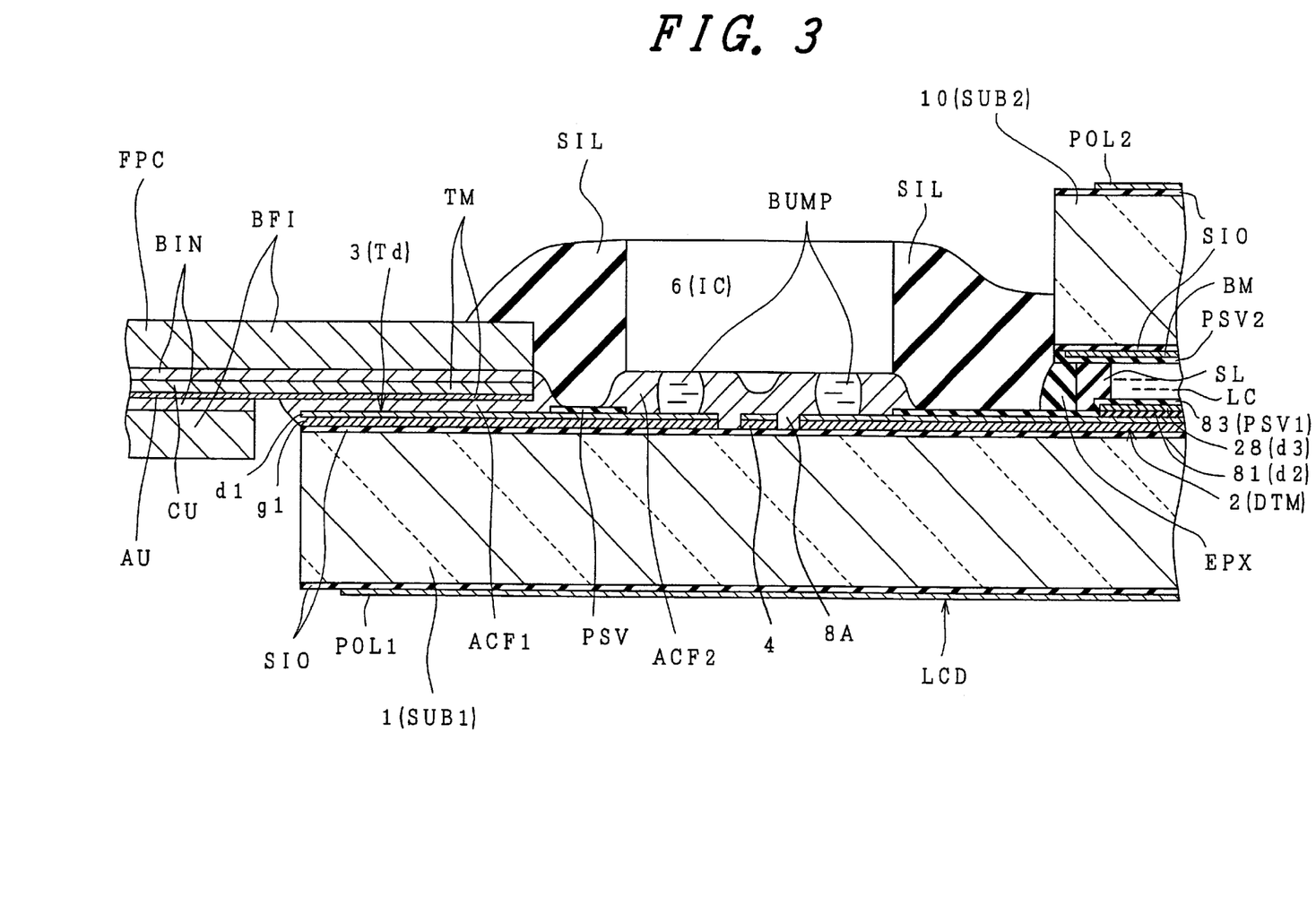
FIG. 3 depicts, in cross-section, part of a liquid crystal panel with driver circuitry mounted thereon by chip-on-glass techniques.

Turning now to FIG. 3 there is shown a sectional view of main part of a liquid crystal panel with driver circuitry mounted thereon by chip-on-glass techniques, which indicates a liquid crystal display device employing the first embodiment of the invention. The structure of this liquid crystal display device is as shown in this drawing. More specifically, a lead terminal 2 (DTM) coupled to an image signal electrode lead as formed on the inner surface of an active matrix substrate 1 (SUB1) is constituted from a laminated (multi-layered) structure of a chromium layer 81 (d2), aluminum layer 82 (d3), and dielectric protective film 83 (PSV1).

While a black matrix BM and color filter are formed on the inner surface of a color filter substrate 10 (SUB2), such color filter is not depicted in the drawing. The black matrix BM and color filter are coated with a dielectric protective film PSV2 whereas liquid crystals LC are sealed in a gap between the opposed upper and lower substrates adhered together by a seal material SL.

A cutaway portion 8A of a separator section 8 between the image signal electrode lead DTM and its associated electrostatic protective lead 4 has been cut by laser light causing an image signal electrode driver circuit 6 (IC) to be mounted in this region. Electrical interconnection between a terminal (BUMP) of the image signal electrode driver circuit 6 and image signal electrode lead DTM plus extension terminal Td and electrical connection between such extension terminal Td and output terminal 3 (TM) are done via anisotropic conductive films ACF2, ACF1.

The output terminal 3 (TM) is connected to an external circuit (multi-layered printed circuit board) FPC for supplying a drive signal from a host computer to the image signal electrode driver circuit 6. Note that although a silica layer SIO is formed on surfaces of the active-matrix substrate and color filter substrate in FIG. 3, this is a thin-film for use in improving the smoothness or flatness of such substrate surfaces and is not any essential matter. Also note that the both substrates have polarizer plates POL1, POL2 as stacked thereon respectively.

Figure 4:
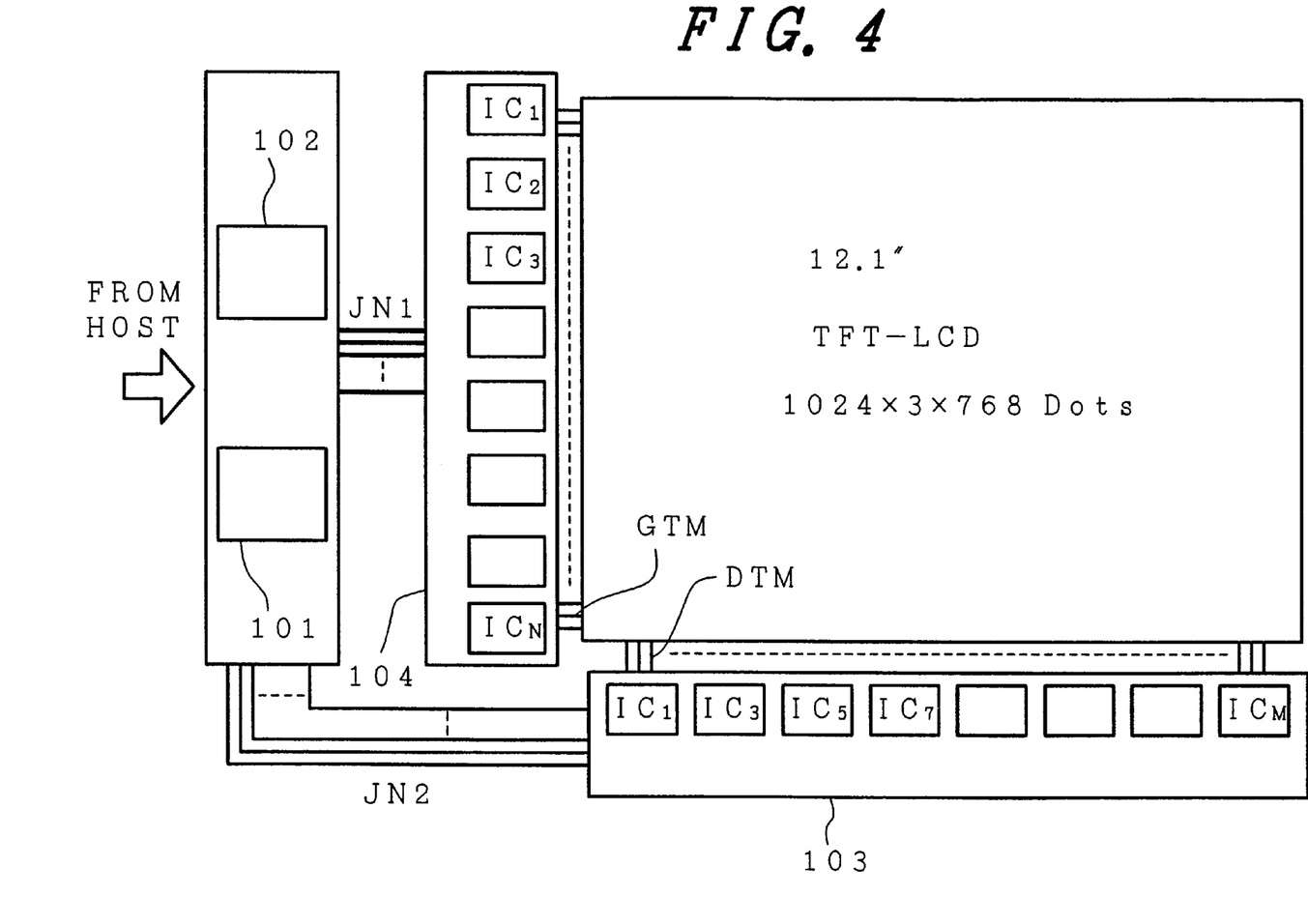
FIG. 4 is a block diagram showing a configuration of a liquid crystal panel and several circuits disposed on the outer periphery thereof constituting the liquid crystal display device to which the present invention is applied.

The block diagram in FIG. 4 depicts a configuration of a liquid crystal panel constituting the liquid crystal display device embodying the invention along with associative circuitry as laid out along the outer periphery thereof. Although not specifically shown in this drawing, the image signal electrode driver circuit (including drain drivers $IC_1$–$IC_x$) is mounted on the lead terminals (DTM in FIG. 3) formed on one of substrates (active-matrix substrate) of the liquid crystal panel and the scan electrode driver circuit (including gate drivers $IC_1$–$IC_N$) is mounted on the other lead terminals GTM formed thereon by on-chip-glass techniques (COG mount schemes) respectively using either an anisotropic conductive film or ultraviolet ray hardenable resin material together, in the exemplified arrangement.

With this exemplary configuration, for 1,024×3×768 effective dots satisfying the XGA graphics standard, a first plurality (M) of image signal electrode driver circuits (drain driver ICs) and a second plurality (N) of scan electrode driver circuits are mounted by COG techniques respectively. In addition, an image signal electrode driver section (drain driver unit) 103 is disposed on the lower side of the liquid crystal panel while causing a scan electrode driver circuit section (gate driver unit) 104 to be placed at the left side plate section with a controller unit 101 and power supply unit 102 being laid out at the same left side plate section. The controller unit 101 and power supply unit 102 plus image signal electrode driver circuit section (drain driver unit) 103 as well as scan electrode driver circuit section (gate driver unit) 104 are mutually connected together by electrical connection means JN1, JN2. Additionally the controller unit 101 and power supply unit 102 are laid out on the back surface of the scan electrode driver circuit section (gate driver unit) 104.

Figure 5:
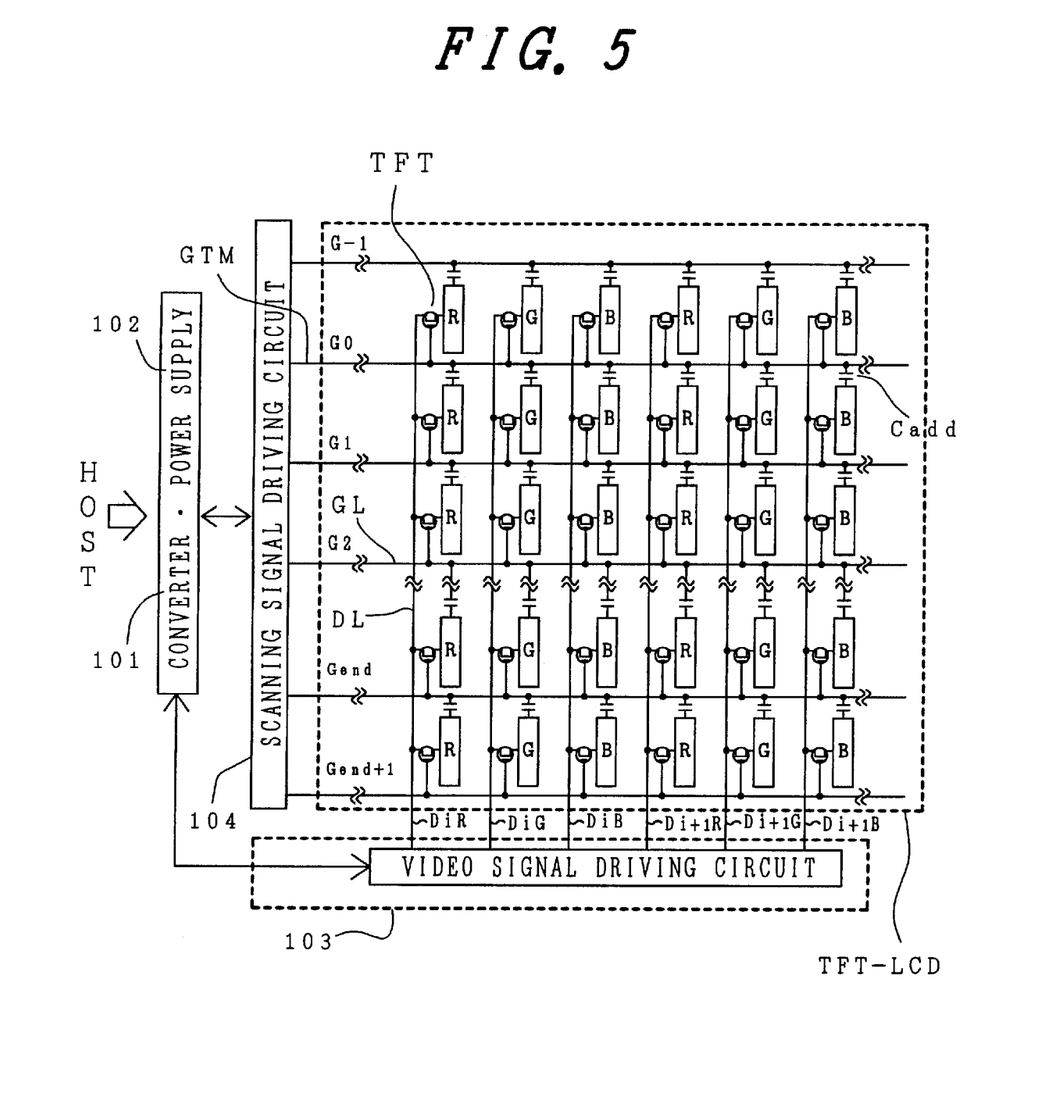
FIG. 5 is a diagram showing equivalent circuitry of the liquid crystal panel embodying the invention along with its associated driver circuitry laid out at the outer periphery thereof.

FIG. 5 depicts an electrical equivalent circuit of a liquid crystal panel incorporating the principles of this invention along with a configuration of circuitry such as driver circuits as laid out at the outer periphery thereof. In this arrangement the image signal electrode driver circuit section (drain driver unit) 103 is disposed only on the lower side of a thin-film transistor (TFI) type liquid crystal panel (TFT-LCD) while the scan electrode driver circuit section (gate driver unit) 104 and controller unit 101 plus power supply unit 102 are laid out at the lateral plate side portion of the liquid crystal panel of the XGA graphics specification consisting of a matrix of 1,024×768 pixels.

The image signal electrode driver circuit section (drain driver unit) 103 is mounted by folding or bending a multi-layered flexible board. An interface board PCB with the controller unit 101 and power supply unit 102 mounted thereon is disposed on the back surface of the scan electrode driver circuit section (gate driver unit) 104 as disposed at the outer peripheral portion along one short lateral side of the liquid crystal panel PNL. This is because the liquid crystal display device (liquid crystal display module MDL) constituting the intended display section is required to minimally decrease or shrink also in width in light of the presence of limitations of the lateral width of information processing apparatus or equipment that is a mounting object, such as personal computers or the like.

As shown in FIG. 5, a thin-film transistor TFF is disposed in an cross-over region of two neighboring image signal electrode leads 2 (drain signal lines DL) and two neighboring scan electrode leads (gate signal lines GL). The thin-film transistor TFT has its drain electrode and gate electrode which are connected to a corresponding image signal electrode lead 2 (drain signal line DL) and a scan electrode lead (gate signal line GL) respectively.

The thin-film transistor TFT also has a source electrode that is connected to a pixel electrode with a liquid crystal layer provided between the pixel electrode and a shared electrode (common electrode) formed on the color filter substrate so that a liquid crystal capacitance ($C_{LC}$) is equivalently connected between it and the source electrode of the thin-film transistor TFT. Upon application of a positive bias voltage to the scan electrode lead (gate signal line GL), the thin-film transistor TFT operates to turn on; when applying a negative bias voltage, it turns off. Additionally a retention capacitance (or alternatively additive capacitor) Cadd is connected between the source electrode of the thin-film transistor TFT and the scan electrode lead (gate signal line GL) of its preceding line.

It should be noted that the source electrode and drain electrode are inherently determinable by a bias polarity between them: In this liquid crystal display device, the polarity thereof is inverted during operations; thus, it should be understood in such a way that the source electrode and drain electrode will exchange in function with each other during operation.

Figure 6:
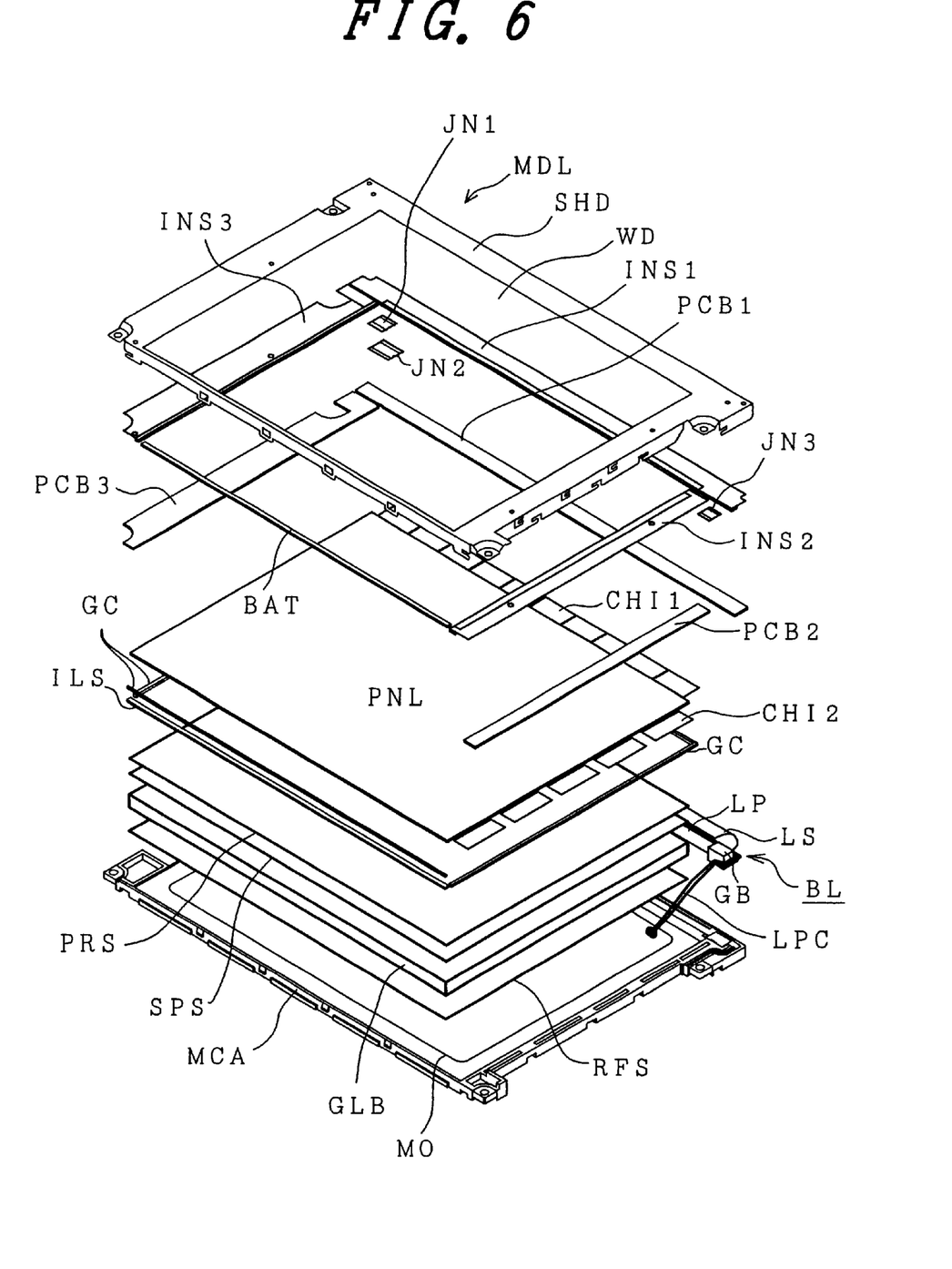
FIG. 6 is an exploded perspective view of an overall structure of an active-matrix liquid crystal display device embodying the invention.

Referring to FIG. 6, there is shown an exploded perspective view of an overall structure of an active-matrix liquid crystal display device embodying the invention. This diagram is for explanation of one practical structure of the liquid crystal display device of the invention (referred to hereinafter as a module MDL with a liquid crystal panel, circuit boards, backlight and other components integrally assembled together).

"SHD" designates a shield casing (also known as metal frame) made of a metal plate; WD denotes a display window; INS1–3 indicate dielectric sheets; PCB1–3 represent printed circuit boards (PCB1 is a drain-side- circuit board for use as an image signal lead 101 drive circuit board, PCB2 is a gate-side circuit board for scan electrode lead 100 drive circuitry, and PCB3 is an interface circuit board); JN1–3 are joiners for electrical connection among the circuit boards PCB1–3; CH11, image signal electrode driver circuitry 6 as directly mounted on the active matrix substrate; CH12, scan electrode driver circuitry as directly mounted similarly; PNL; liquid crystal display panel; GC, rubber cushion; ILS, optical shielding spacer; PRS, prism sheet; SPS, optical diffuser sheet; GLB, light guide plate; RFS, reflection sheet; MCA, lower-side casing (mold frame) as formed by all-at-a-time machining; MO, opening of MCA; LP, fluorescent tube; LPC, lamp cable; GB, rubber bush for support of the fluorescent tube LP; BAT, both-side adhesive tape, BL, backlight unit consisting essentially of more than one fluorescent tube and light guide plate and others, wherein diffuser plate members are stacked or laminated over one another to assemble the liquid crystal display module MDL.

The liquid crystal display module MDL is designed to have two different types of enclosure/retaining members such as the lower-side casing MCA and shield case SHD, and is structured from an integral assembly of the shield case SHD made of a chosen metal with the dielectric sheets INS1–3 and circuit boards PCB1–3 plus liquid crystal panel PNL received and rigidly secured therein and the lower-side case MCA accommodating therein the backlight BL consisting essentially of the linear lamp LP and light guide plate GLB plus prism sheet PRS and others.

The interface circuit board PCB3 has circuit components mounted thereon, including more than one integrated circuit (IC) chip for receiving an image signal(s) incoming from an external host and also a control signal or signals such as a timing signal or the like along with a timing converter TCON for processing the timing to generate a clock signal required.

Although in FIG. 6 the liquid crystal panel has been explained in a way such that it employs the so-called COG scheme with its image signal driver circuitry and scan, electrode driver circuitry (ICs CH1, CH2) being directly mounted on the active-matrix substrate, the present invention should not be limited only to the liquid crystal panel of the type which uses such mount technique and may also be applied to traditional mount schemes using tape carrier package (TCP) structures.

Figure 7:
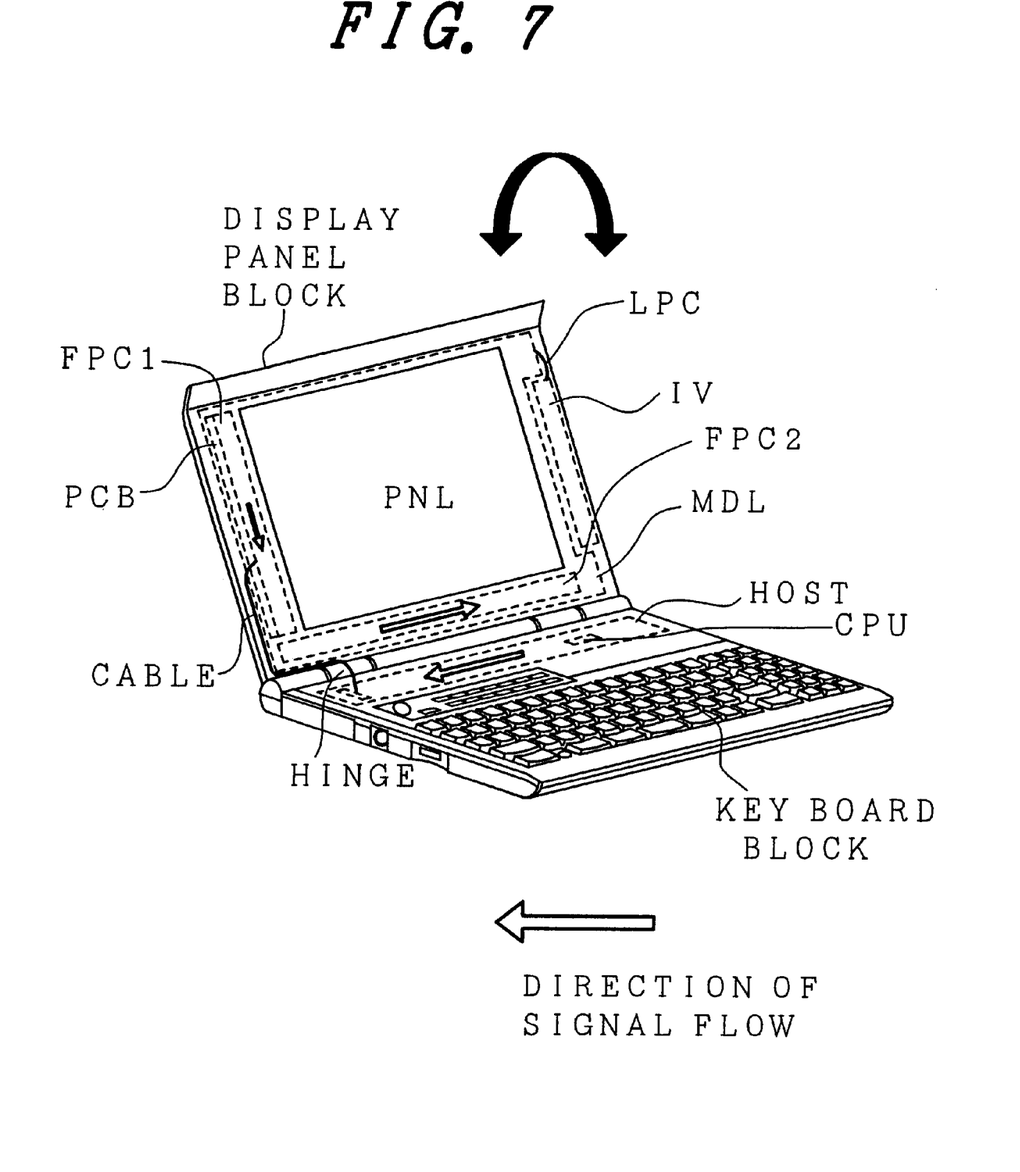
FIG. 7 is a perspective view of a notebook personal computer in accordance with a further embodiment of the invention.

FIG. 7 depicts a perspective view of a notebook type personal computer (PC) employing the liquid crystal display device in accordance with a further embodiment of the invention. This notebook PC (portable or hand-held PC) is generally constituted from a keyboard unit (main body unit) and a display unit as tiltably coupled by hinges to the keyboard unit. The keyboard unit is designed to accommodate a keyboard and host (host computer) plus signal generation functions such as a CPU or else whereas the display unit's casing CASE has the liquid crystal panel PNL, at the periphery of which a PCB having thereon driver circuit boards FPC1, FPC2 and control chip CON is assembled along with its associated components including but not limited to an inverter power supply board IV for use as the backlight power supply.

This portable PC comes with its liquid crystal panel of the type which is structured in the way stated supra in relation to said embodiment and is thus capable of obtaining high-quality image displayability without suffering from any display irregularities.

Although in the above embodiments an explanation was given of the separator section relative to the image signal electrode leads and electrostatic protective lead, the inventive teachings as disclosed herein may also be applicable similarly to a separator section between an electrostatic protective lead and scan electrode leads in cases where the scan electrode leads also are provided with such electrostatic protective lead.

As has been explained above, according to the present invention, it is possible to provide an improved liquid crystal display device capable of eliminating those defects otherwise occurring due to accidental electrical short circuiting as resulted :from the presence of residual cutaway fragments at separator sections lying between image signal electrode leads and electrostatic protective lead(s) and/or reattachment of splash fragments or particles thereto, which may in turn enable achievement of high-quality on-screen image displayability that is free from any possible display irregularities and defects while increasing manufacturing yields and reliability.

While we have shown and described several embodiments in accordance with the present invention, it is understood that the same is not limited thereto but is susceptible of numerous changes and modifications as known to those skilled in the art, and we therefore do not wish to be: limited to the details shown and described herein but intend to cover all such changes and modifications as are encompassed by the scope of the appended claims.

What is claimed is:

1. A liquid crystal display device comprising:
a color filter substrate having a common electrode and color filters of multiple colors on an insulating substrate;
an active-matrix substrate having a plurality of scan electrode leads formed on an insulating substrate, a plurality of image signal electrode leads formed to cross over or intersect the scan electrode leads, a plurality of thin-film transistors which are two-dimensionally laid out for connection to the scan electrode leads and the image signal electrode leads to thereby form an effective display area, picture element electrodes connected to the thin film transistors, respectively, more than one additional capacitance element connected to the picture element electrodes, a common electrode lead terminal for connection to the common electrode formed on the color filter substrate, scan electrode lead terminals railed to extend from the scan electrode leads and image signal electrode leads up to one outer side of the effective display area along with image signal electrode lead terminals extending to a remaining side neighboring to the one side, and a dielectric protective film coating at least the thin film transistors, said active-matrix substrate opposing said color filter substrate with a specified gap defined therebetween for liquid crystals;
driver circuitry, including a scan electrode driver circuit and an image signal electrode driver circuit, for supplying the scan electrode lead terminals and the image signal electrode lead terminals with a signal voltage for use in visually displaying images;
an electrostatic protective lead connected in common to the image signal electrode lead terminals for protecting the thin film transistors against static electricity; and
separator sections, each of which is provided between one of the image signal electrode lead terminals and the electrostatic protective lead during manufacture of the active-matrix substrate and is cut after the manufacture, wherein each of the separator sections has a laminated structure formed of a low resistivity metal layer and a high-melting-point metal layer.

2. A liquid crystal display device according to claim 1, wherein the laminated structure of said separator section includes a layer made of chromium, or an alloy containing therein chromium as its major components and a layer of aluminum, or an alloy containing aluminum therein, plus a dielectric protective film, these materials being laminated over said active-matrix in this order of sequence.

3. A liquid crystal display device according to claim 1, wherein the separator sections are cut by a laser beam scanning along the electrostatic protective lead.

4. A liquid crystal display device according to claim 1, wherein the separator sections are coated with a dielectric protective film.

* * * * *